United States Patent [19]

Counsell et al.

[11] Patent Number: 5,700,993
[45] Date of Patent: Dec. 23, 1997

[54] HEATING APPARATUS CONTROLLED TO UTILIZE LOWER COST ENERGY

[75] Inventors: John M. Counsell, Merseyside; John H. Reeves, Cheshire, both of United Kingdom

[73] Assignee: EA Technology Limited, Chester, United Kingdom

[21] Appl. No.: 549,850

[22] PCT Filed: May 16, 1994

[86] PCT No.: PCT/GB94/01037

§ 371 Date: Mar. 15, 1996

§ 102(e) Date: Mar. 15, 1996

[87] PCT Pub. No.: WO94/27202

PCT Pub. Date: Nov. 24, 1994

[30] Foreign Application Priority Data

May 17, 1993 [GB] United Kingdom ............... 9310078

[51] Int. Cl.$^6$ ................................................ H05B 1/02
[52] U.S. Cl. ..................... 219/483; 219/485; 219/497; 219/494; 219/486; 392/339; 165/18; 165/2
[58] Field of Search .................... 219/483–486, 219/497, 505, 508, 506, 501, 494; 392/339–345; 165/18, 2, 28

[56] References Cited

U.S. PATENT DOCUMENTS

| | | | |
|---|---|---|---|
| 4,213,032 | 7/1980 | Olsen et al. | 219/364 |
| 4,775,944 | 10/1988 | Nakamura | 364/505 |
| 4,908,498 | 3/1990 | Kivela | 219/494 |
| 4,940,079 | 7/1990 | Best et al. | 165/2 |
| 5,481,140 | 1/1996 | Maruyama et al. | 307/11 |

FOREIGN PATENT DOCUMENTS

| | | |
|---|---|---|
| 0 013 287 | 7/1980 | European Pat. Off. |
| 0 191 481 | 8/1986 | European Pat. Off. |
| 0 286 888 | 10/1988 | European Pat. Off. |
| 2212949 | 8/1989 | United Kingdom. |

OTHER PUBLICATIONS

"An Experiment in Real Time Pricing for Control of Electric Thermal Storage Systems", *IEEE Transactions on Power Systems* 6 (1991), Nov. No. 4, New York, pp. 1356–1365.

*Primary Examiner*—Mark H. Paschall
*Attorney, Agent, or Firm*—Westman, Champlin & Kelly, P.A.

[57] ABSTRACT

A heating control apparatus for use in a heating system having heaters for heating at least one location and temperature sensors for measuring the temperature of each location is disclosed. The heating system is connected to an electricity supply having a tariff which varies with time. The heating control apparatus comprises a data receiving arrangement for receiving data on the tariff and weather prediction information. A selector is provided which is operable by a user to select the desired temperature for each location and a desired time and duration of the desired temperature. A controller includes a memory for storing information on the thermal characteristics of each location and the heaters and is responsive to the data, the measured temperature and the temperature selected by the user as well as the stored information to determine the times at which the heaters are to be energised. The controller then controls the heaters in order to achieve the desired temperature in each location.

14 Claims, 5 Drawing Sheets

FIG. 2. PROPOSED RADIO TELESWITCHING SYSTEM.

HEATING APPARATUS CONTROLLED TO UTILIZE LOWER COST ENERGY

BACKGROUND OF THE INVENTION

The present invention relates to a heating system which utilises electricity having a tariff which varies with time. In particular, the present invention relates to heating control apparatus for use in such a heating system to control heating means to achieve a desired temperature at one or more locations.

The efficient control of heating systems is desirable in order to ensure that the desired temperature for a location is achieved with maximum efficiency.

Electricity Utilities have been providing simple split rate tariffs such as a seven hour cheap rate period, for some time. However, the true cost of generating electricity is not reflected in this tariff and more recently complex tariffs have been introduced.

Since the advent of the Pool Pricing system following privatisation of the Electricity Industry in the United Kingdom, the electricity generators have introduced multi-rate tariffs that reflect more closely the true cost of supplying electricity at any particular time of day or night. It is likely that this pricing system will be extended to more complex tariffs and could lead to a Pool Pricing system with a tariff for which the price of electricity changes every half an hour during a day and also changes from day to day.

FIG. 1 illustrates a graph of the average pool price and national electricity power consumption for November 1990 over a twenty four hour period. It can be seen from this graph that the pool price substantially mirrors the national power demand and forms a complex tariff structure.

They are already heating control systems which utilise simple split rate tariffs. However, such systems are likely to have great difficulty coping with complex and real time tariffs.

SUMMARY OF THE INVENTION

The present invention provides heating Control apparatus for use in a heating system having heating means for heating at least one location, and temperature measuring means for measuring the temperature at said at least one location, said heating system being connected to an electricity supply having a tariff which varies with time; said heating control apparatus comprising data receiving means for receiving data on said tariff and weather prediction information; user selection means operable by a user to select a desired temperature for said at least one location and a desired time and duration of said desired temperature; storage means for storing information on the thermal characteristics of said at least one location and said heating means; and control means responsive to said data receiving means, said temperature measuring means, said user selection means, and said stored information to determine the times at which said heating means is energised, said control means being operative to control said heating means accordingly in order to achieve said desired temperature at said at least one location.

Preferably the heating means comprises storage heating means and direct heating means provided at the or each said location, and said control means is operative to energise said storage heating means when said tariff is low.

In another embodiment of the present invention said control means is operative to control said direct heating means to only supply a small amount of the total heat input to the or each said location in order to achieve said desired temperature at the or each location.

Preferably said heating system includes a heating means for each of a plurality of locations and a temperature measuring means for each said location, and said user selection means is adapted to allow a user to select desired temperatures for each said location. The control means is then operative to independently control each heating means to achieve the desired temperature in each said location.

In one preferred embodiment of the present invention the control means is operative to use said stored information and said weather prediction information to calculate a predicted temperature for the or each said location.

Preferably the present invention achieves the desired temperature by utilising storage heating means which is able to draw electricity at times when the tariff is low. Such storage heating means will then radiate its stored heat to achieve the desired temperature. By forming a model of the thermal characteristics of the or each location and the heating means, it is possible to predict the temperature which will result from input power to both the storage heating means and the effect of the direct heating means. Thus preferably the storage means is adapted to store model parameters for direct heating and storage heating and the control means is operative to determine the relationship between direct heating power and measured temperature and storage heating power and measured temperature using respective models which use respective said model parameters.

In one preferred embodiment of the present invention the control means is responsive to a difference between a said predicted temperature for a location and a measured location for said location to control said direct heating means to achieve said desired temperature at said location. Thus, if the stored response characteristics are in error then the temperature at a location will not be the same as the predicted temperature. In order to ensure that the desired temperature at the location is achieved then the control means controls the direct heating means to input heat to overcome any heating deficiency.

In one embodiment of the present invention storage means is adapted to store values for coefficients of a set of weighted transfer functions. The coefficients represent characteristic parameters of the location and the heating means.

Preferably the control means is operative to compare the measured temperature at the or each location with the predicted temperature, and to modify said stored information adaptively to reduce any difference. This allows the heating control apparatus to be installed in for instance a building and to learn the thermal characteristics of the locations to be heated and the heating means.

In one embodiment of the present invention the control means is operative to control the energisation of said heating means to preferentially utilise electricity supplied when the tariff is low so as to reduce the total cost of heating said at least one location to achieve said desired temperature.

In another embodiment of the present invention said control means is operative to control the energisation of said heating means to minimise the total energy consumption utilised in heating said at least one location to achieve said desired temperature.

In a further embodiment of the present invention said control means is operative to control the energisation of said heating means to preferentially utilise electricity which maximises the profit margin of the Utility.

Preferably said control means is operative to reduce a cost function which comprises a weighted sum of at least two of the total cost, the energy consumption, and the inverse of the profit to the utility. In one embodiment the weights of the sum are selectable by a user.

In another aspect the present invention provides a heating system for use with an electricity supply having a tariff which varies with time, comprising heating means for heating at least one location; temperature measuring means for measuring the temperature of said at least one location; data receiving means for receiving data on said tariff and weather prediction information; user selection means operable by a user to select a desired temperature for said at least one location and a desired time and duration of said desired temperature; storage means for storing information on the thermal characteristics of said at least one location and said heating means; and control means responsive to said data receiving means, said temperature measuring means, said user selection means, and said stored information to determine the times at which said heating means is energised, said control means being operative to control said heating means accordingly in order to achieve said desired temperature at said at least one location.

Thus embodiments of the present invention provide heating control apparatus which utilises a mix of storage and direct acting heaters operating with complex tariffs to provide improved thermal comfort at reduced cost to the user and to the utility.

In the implementation of such an arrangement it is necessary to receive tariff information which comprises the cost of electricity over a future period and weather prediction information for the environment surrounding the or each location to be heated.

DESCRIPTION OF THE PREFERRED EMBODIMENTS

Figure 1:
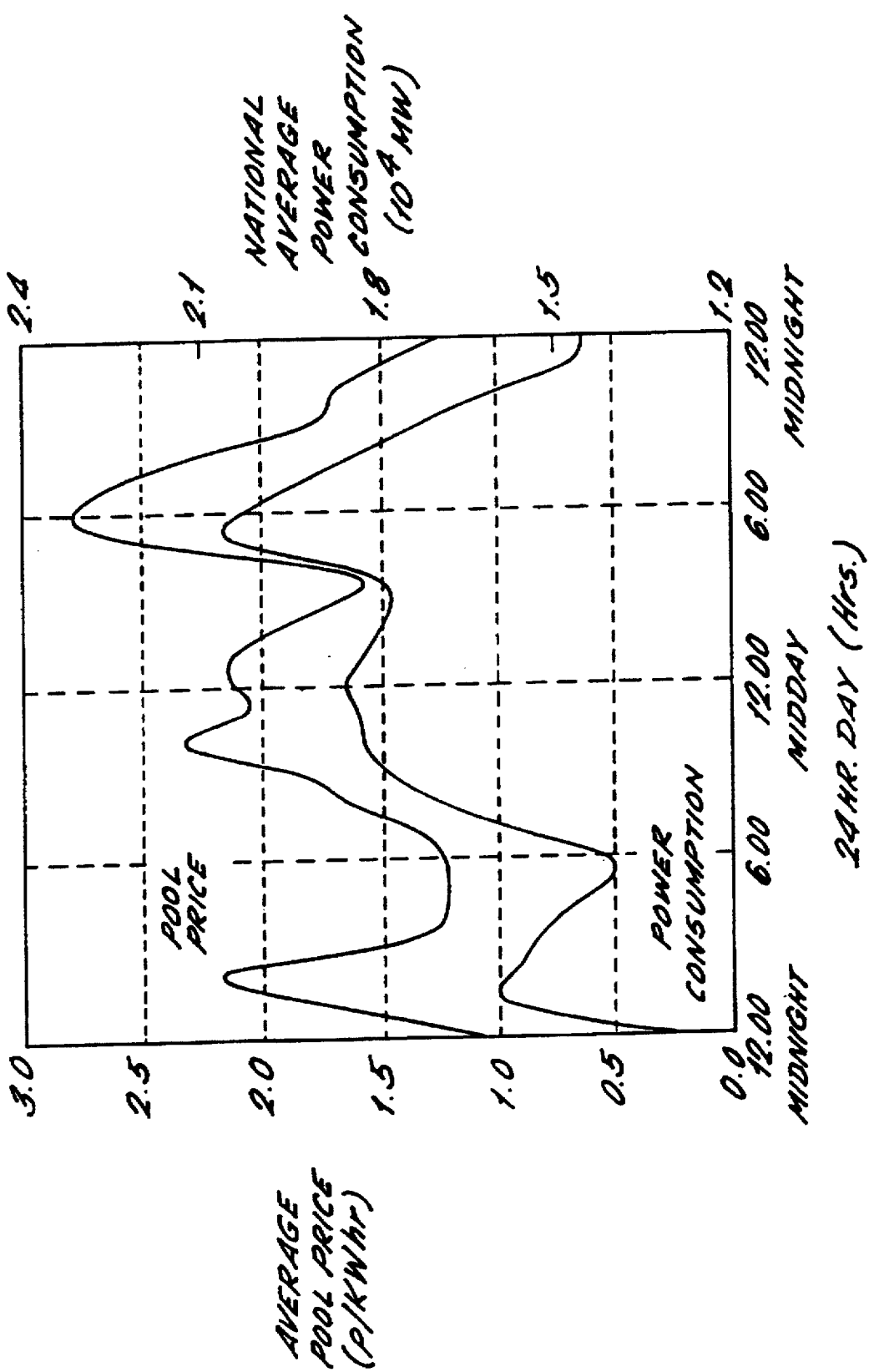
FIG. 1 is a graph of the average pool price of electricity and national electricity power consumption over a twenty four hour period for November 1990.
Figure 2:
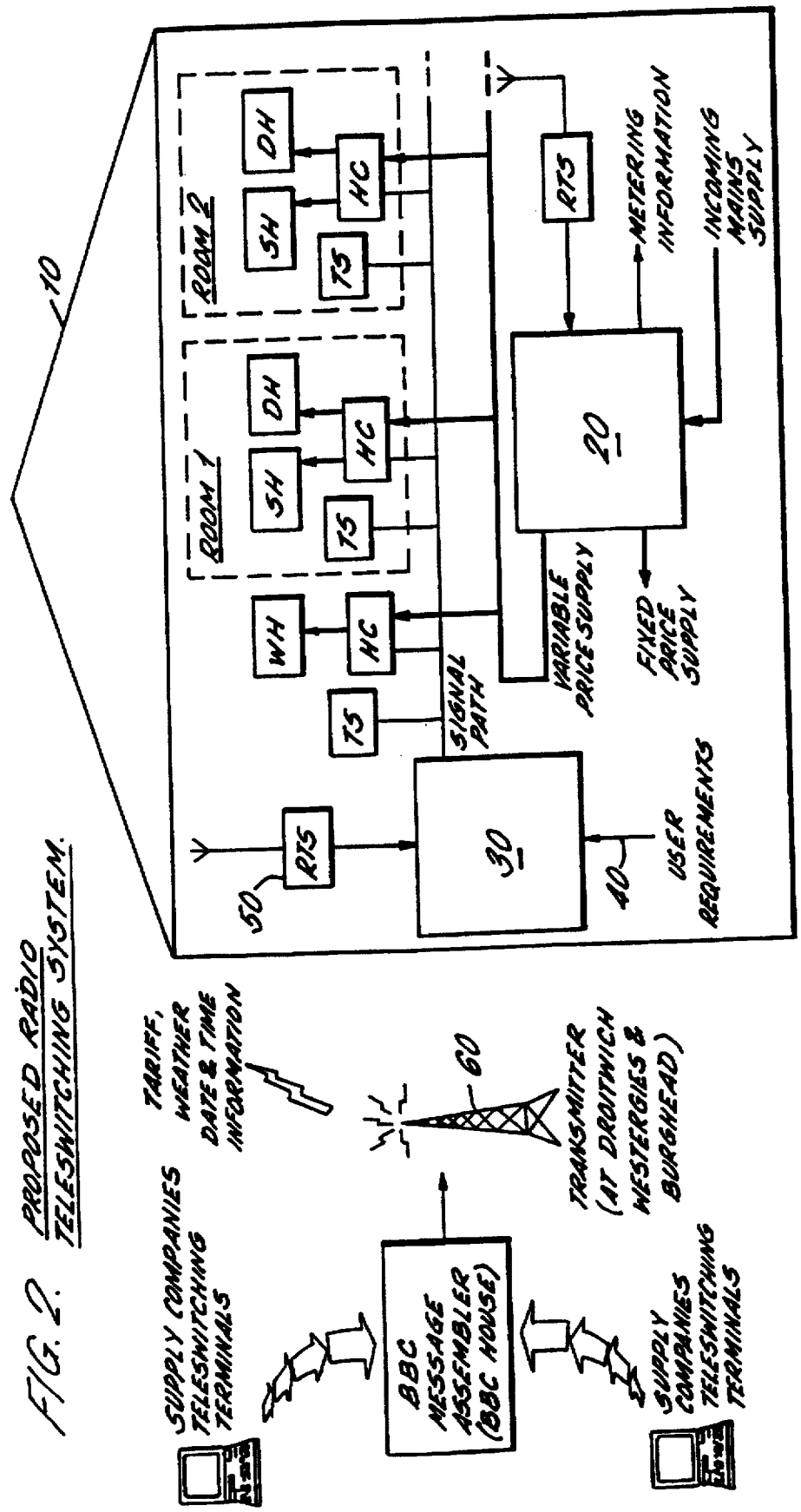
FIG. 2 is a schematic illustration of a heating control system incorporating the heating control apparatus of the present invention.

Referring now to FIG. 2 of the drawings, this illustrates a heating system utilising the heating control apparatus according to one embodiment of the present invention. The heating system illustrated in FIG. 2 is provided within the customer's premises 10 and comprises a two element multi-rate energy meter 20 to meter the incoming mains supply. In this embodiment the two element multi-rate energy meter is provided to meter a fixed price supply for use within the customer's premises by other appliances, and a variable price supply for use by the heating system of the present invention. In the arrangement shown in FIG. 2 remote metering is provided for using the radio teleswitch (RTS). This is not however an essential feature of the present invention.

The variable price supply is then provided to several heating controllers (HC) which control storage heaters (SH) and direct heaters (DH) in rooms 1 and 2. Also, there is a heating controller (HC) controlling a water heater (WH). Within each room there is provided a temperature sensor (TS) and there is a temperature sensor (TS) for the water heater (WH). The temperature sensors (TS) communicate with an optimising controller 30. The optimising controller 30 also communicates with the heating controllers (HC) in order to control the switching of the heaters to the variable price supply. The optimising controller 30 is also provided with a user requirement input 40 whereby a user can set a desired temperature and the times and durations of the desired temperature for each location. The optimising controller 30 will then control the heaters to achieve the desired temperatures at the locations.

The optimising controller 30 is also provided with an input via a radio teleswitch 50 which receives tariff, weather and date and time information from a transmitter 60. Such a transmitter 60 can receive and transmit information from for instance the BBC.

Although FIG. 2 has been described with reference to the receipt of data using a radio teleswitch, any form of remote communication can be used. Also, although the optimising controller 30 is shown as being linked to the temperature sensors (TS) and heating controllers (HC) by wires, equally, any form of communication link such as a local radio communication link can be used.

In the arrangement illustrated in FIG. 2 the optimising algorithms can reside either in a central optimising controller or within intelligent combined storage and direct heaters.

Figure 3:
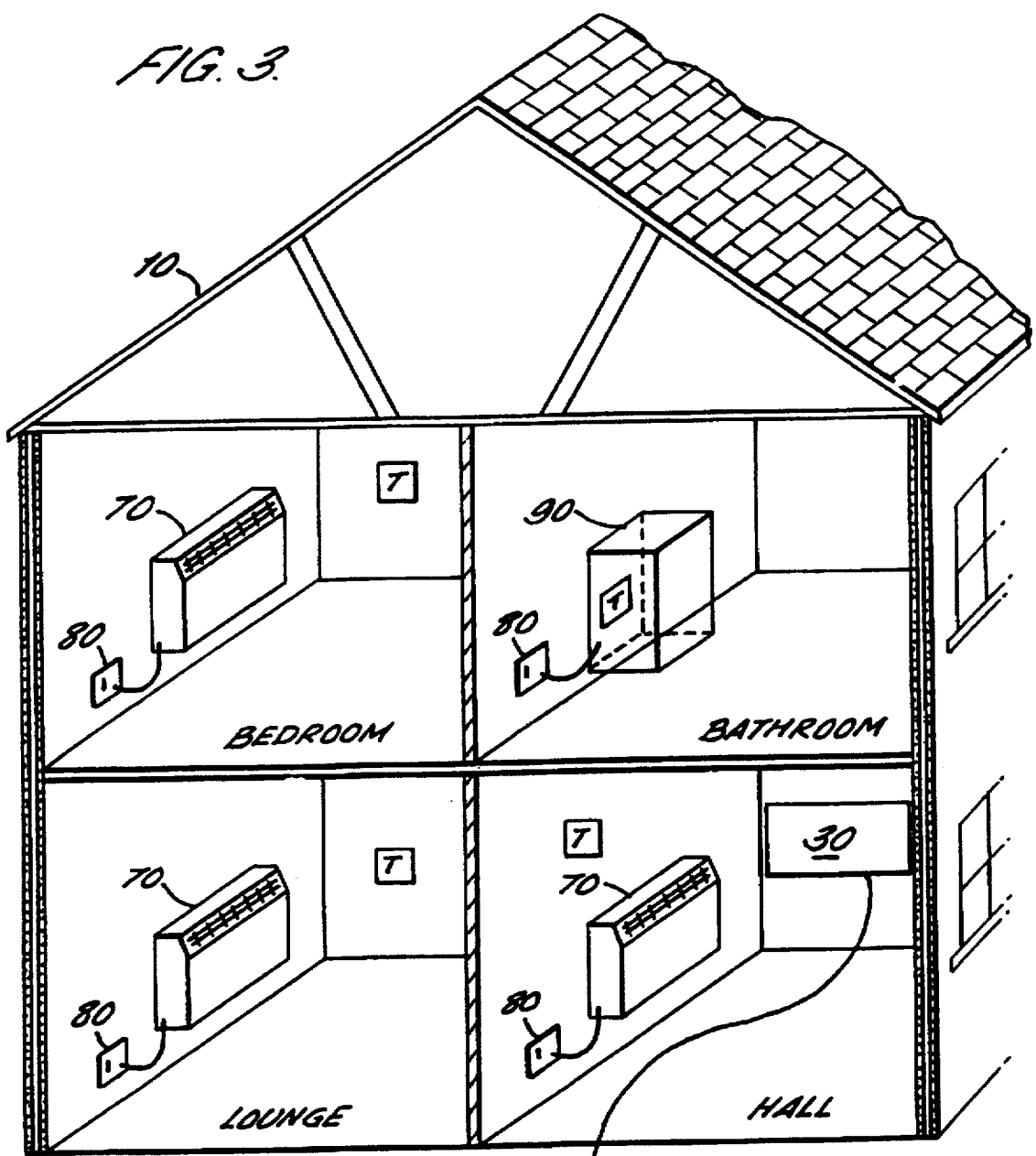
FIG. 3 is an illustration of the practical arrangement for a heating control apparatus of FIG. 2.

FIG. 3 illustrates a typical arrangement for the heating system within the customer's house 10. In the hall there is provided the optimising controller 30 which receives tariff information and outside temperature predictions. The optimising controller 30 is also provided with means to allow a user to enter the desired temperatures. Within each of the hall, lounge, bedroom there is provided a heater 70 which comprises a storage heater and direct heater. This is provided with a receiver 80 to receive switching instructions from the optimising controller. Within each of these rooms there is also provided temperature sensors (T) which are provided with transmitters to transmit information on the temperature within these rooms to the optimising controller 30. Within the bathroom there is provided a water heater 90 which is also equipped with a radio receiver 80 to receive switching instructions from the optimising controller 30. The water heater 90 also includes a temperature sensor (T) which is equipped with a transmitter to transmit information on water temperature to the optimising controller 30.

Thus using the arrangement shown in FIG. 3 the user can set the desired temperature of individual rooms and of the hot water supply and the optimising controller 30 then communicates with the heaters 70 and water heater 90 in order to control their energisation in order to efficiently utilise the complex multi-rate electricity supply.

Figure 4:
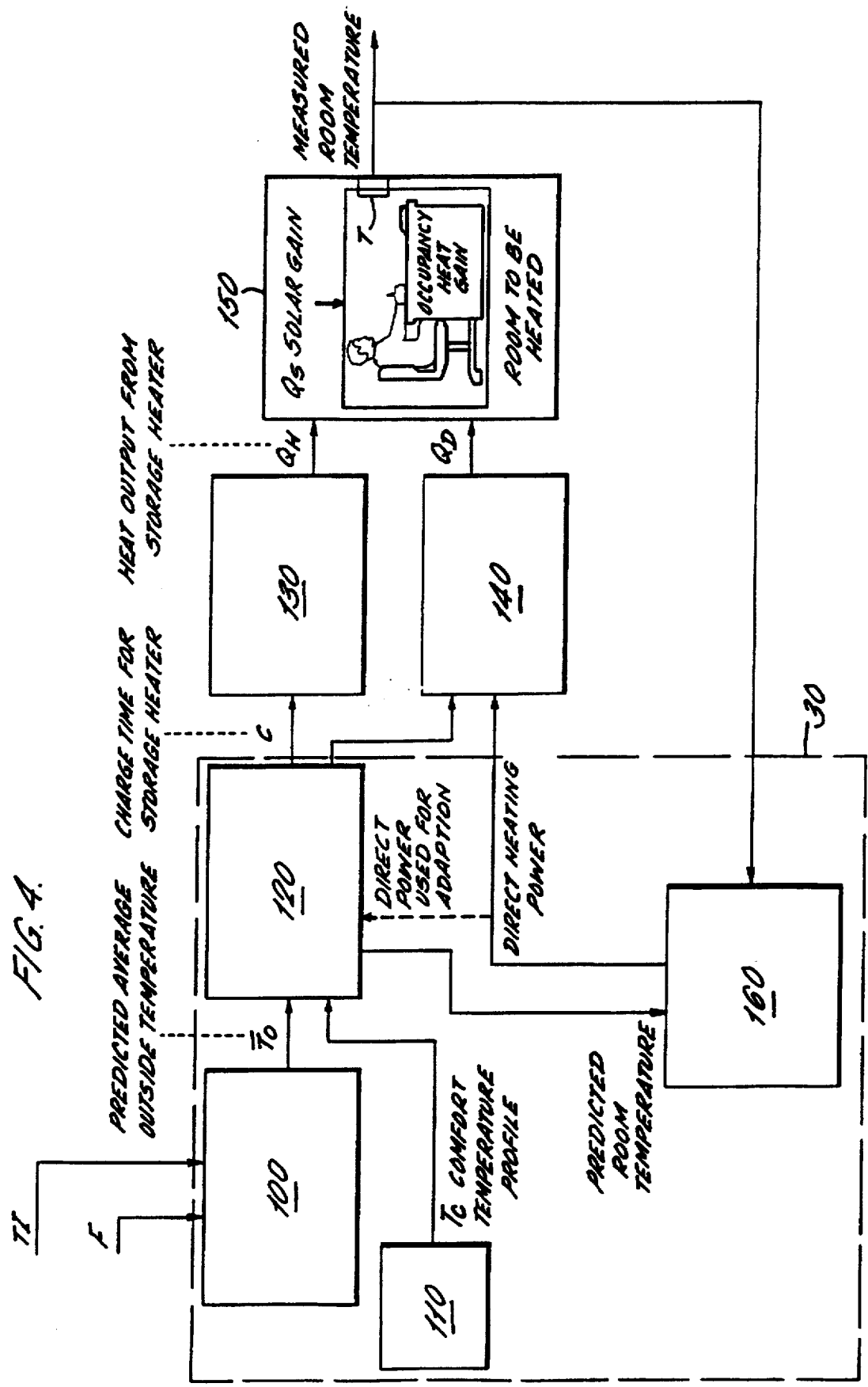
FIG. 4 is a schematic illustration of the optimised space heating control system according to one embodiment of the present invention.

FIG. 4 illustrates in more detail the optimised heating control system according to one embodiment of the present invention. In the arrangement shown in FIG. 4 only one location to be heated is illustrated although the arrangement is equally applicable to the control of the temperature in many locations.

The optimising controller 30 comprises a comfort heating control unit 110 whereby a user can enter the desired temperatures $T_c$ for the location to be heated. The optimising controller 30 also includes the average outside temperature predictor 100, This receives the tariff information (TI) and the forecast outside temperature (F). The predicted average outside temperature from the predictor 100 and the desired temperature $T_c$ from the comfort heating control unit 110 are then input into an optimiser unit 120. The optimiser 120 takes into consideration the tariff information (TI), the forecast temperature (F) and the desired temperature $T_c$ in order to determine the times at which the storage heater 130 and direct heater 140 are to be connected to the variable price electricity supply in order to heat the location 150 to achieve the desired temperature. In determining the times at which the heaters 130 and 140 are to be energised, a model of the thermal response of the heaters 130 and 140 and the location 150 is used to predict the room temperature resulting from energisation of the heaters 130 and 140 taking into consideration the predicted outside temperature (F).

The temperature within the location is measured by a temperature sensor (T) and this measurement is fed back to a robust feedback controller 160 within the optimising controller 30. The robust feedback controller 160 also receives a value for the predicted room temperature and this is compared with the measured room temperature. If there is a discrepancy, the robust feedback controller 160 controls the switching of the direct heater 140 to heat the location 150 to achieve the desired temperature. The optimiser 120 also receives an indication of the difference between the predicted and measured temperatures and this is used within the optimiser 120 to adapt the model of the thermal characteristics of the heaters 130 and 140 and location 150. Using this adaption technique it is not necessary for the optimiser when newly installed in a building to have an accurate model of the thermal characteristics of the location 150 or the heaters 130 and 140. It is possible for the optimiser 120 to adaptively learn the thermal characteristics and thereby build up a model which can be used to provide an accurate prediction of the room temperature resulting from energisation of the heaters 130 and 140.

In order for the optimiser 120 to calculate a predicted temperature for a location it is necessary for it to have a mathematical model which will describe the dynamic behaviour of the system. With environmental systems this dynamic behaviour is very imprecise and consequently it is virtually impossible to derive the accurate differential equations from fiscal reasoning. However, it is possible to describe the character of the process by a set of weighted transfer functions and associated parameters. This generalised description of the process can be used in conjunction with real system input and output data to accurately derive the transfer function type and parameters.

The dynamic description of a domestic room can be confined to the following transfer function types to yield an expression for the measured change in room temperature, as a function of changes in the direct acting heat input and outside temperature.

$$T(s) = G_d(s)G_r(s)q(s) + G_d(s)G_w(s)w(s) \quad (1)$$

where $$q(s) = d(s) \quad (2)$$

$$G_d(s) = e^{-sd} \quad (3)$$

$$G_r(s) = (b_1 s + b_2)/(s^2 + a_1 s + a_2) \quad (4)$$

$$G_w(s) = a_2/(s^2 + a_1 s + a_2) \quad (5)$$

d is the time delay (h) in the measurement of a change in temperature which will depend on the position of the temperature sensor, $b_1$, $b_2$, $a_1$ and $a_2$ are constant parameters describing the rooms transient and steady state characteristics, $G_r(s)$ represents the transfer function from heat input to room temperature (° C/W), $G_w(s)$ represents the transfer function from outside temperature to room temperature, $G_d(s)$ represents the time delay from room temperature to measured temperature, T(s) is the change in room temperature (K) from some initial and steady condition, d(s) is the change in direct acting power (W), w(s) is the change in outside temperature (K), q(s) is the change in heat input to the room (W)

and s is the Laplace operator ($h^{-1}$).

This transfer function can be converted into a discrete-time equivalent where data is generated at a fixed sampling frequency. This data can then be directly compared with suitable measured data taken at the same sampling frequency. Then a known optimisation method such as that desribed at pages 305 to 309 of "Numerical Recipes in C" by H. M. Press (1990 Cambridge University Press) can be applied to give the best least squares fit between the output data from the model and the output data from the system. When using this procedure it is important that any know static non-linearities such as saturation of the direct heat input is accounted for in the model.

The other form of electric heating considered is that of a simple storage heater capable of accepting up to eight hours of charge. It is assumed that the output characteristics of a storage heater can be reasonably predicted based on the amount of electrical energy input into the heater. In fact most manual storage heaters with the damper systems closed can be adequately described by a non-linear second order model of the form:

$$dq(t)/dt = (1/\tau_q)(K_h[T_c(t) - T(t)] + K_r(T_c(t)^4 - T(t)^4) - q(t)) \quad (6)$$

$$dT_c(t)/dt = (1/\tau_o)(K_c c(t) - T_c(t)) \quad (7)$$

where c(t) is the charge input to the storage heater (W), $T_c(t)$ is the core temperature (K), $\tau_o$ and $\tau_1$ are the heater time constants associated with the core and insulation respectively (h)

$K_h$ and $K_r$ are the heat transfer gains for convection and radiation respectively (W/K)

$K_c$ is the thermal gain of the core (K/W) and t is the time (h)

These accurate and validated models for the controlled environment and heating systems are used in the robust temperature feedback controller for direct heating and to optimise the schedule of direct and storage heating for a given cost criterion.

The optimiser takes the thermal response characteristics which have been identified using the techniques described hereinabove along with the predicted outside temperature information and the tariff informaton and minimises a particular cost criterion (function). This cost function can be weighted in three separate directions to minimise one or a combination of the following:

1) daily total energy consumption E (kWh), 2) daily total running costs R (p), or 3) inverse of daily profit to the utility P (p) (i.e. maximise the profit to the utility).

In practice the cost function will be a combination of the above three such that $$C = W_E E + W_R R + W_P P \quad (8)$$

where

C is the cost variable to be minimised and $W_E$, $W_R$ and $W_P$ are weights to lean the optimiser in the preferred direction.

The robust feedback controller 160 for controlling the direct heater 140 when the predicted temperature does not reach the measured temperature, is based on a robust servo-mechanism design such as that disclosed in an article by E. J. Davidson and A. Goldenberg 1975 Automatica Volume 11, pages 461 to 471 entitled "The Robust Control of a General Servo Mechanism Problem: The Servo Compensator". The controller 160 operates the direct heater 140 only to ensure that any shortfall in the desired temperature due to errors in the optimiser's predicted room temperature will be compensated for by adjustment of the direct heater 140. When the model within the optimiser 120 is in error, the robust controller could be forced to use power at times when it is relatively expensive. Providing the optimiser 120 is able to control the heaters 130 and 140 to achieve close to the desired temperature at the location, the total energy used during relatively expensive periods will be small.

When the robust feedback controller 160 identifies a difference between the predicted temperature and the measured temperature it not only controls the direct heater 140 to heat the location 150 to achieve the desired temperature, it also provides a measure of the direct power input to the optimiser 120 to indicate that the model used within the optimiser 120 is in error.

In order for the optimiser 120 to achieve close to the optimum solution it is necessary for it to have a good knowledge of the dynamic characteristics of both the room or location to be controlled and the heaters. In practice, it would be both difficult and expensive to commission a control system according to the present invention if these characteristics had to be derived for every room in the home. However, it is possible to simplify the model of the room and produce a relatively simple method to identify (i.e. adapt) important thermal properties of the home.

The adaptive model does not need to predict room temperatures accurately every minute. It is thus possible to reduce the short timescale accuracy of the model with the benefit of reducing the number of parameters to be identified. An important factor which makes possible to reduce the short timescale accuracy of the model is the fact that the dynamics of the storage heater are slow. It is therefore possible for a model of the room to be reduced to a first order model and still be accurate over for example a quarter of an hour period. One suitable adaptive technique for adapting the model of the room is the auto regressive moving average technique such as disclosed by R. G. Hayes in his PhD. Thesis 1980, University of Dublin entitled "Off-Peak Charge Control in Stored Energy Heating Systems".

The purpose of the optimiser 120 is to calculate the relationship between an optimum mix of storage and direct heater power with time which is required to obtain the desired temperature profile for each room. This should be achieved whilst minimising the cost function described hereinabove. In order to calculate the optimum mix of storage and direct heater power the optimiser 120 calculates the predicted temperature for each room at all times during the day. When the cost function to be minimised is weighted towards reducing the total running costs, then the optimiser will attempt to utilise electricity when it is at its cheapest. This entails energising the storage heater 130 for as long as possible during the cheapest periods of the electricity supply. The direct heater 140 can then be controlled by the optimiser to use more expensive electrical power only where it is necessary to achieve the desired temperature.

To achieve optimisation, the optimiser 120 can use any non-linear optimisation technique such as that described in "Numerical Recipes in C" by H. M. Press, Cambridge University Press 1990. This technique operates to minimise a non-linear cost function. The cost function is non-linear since it comprises of dynamic mathematical relationships between power profiles of the direct acting system, storage system, thermal model of the building/room, tariff information and the user minimum temperature requirements. The cost function is complex and in general comprises of the following steps. For a 24 hour horizon divided into n discrete steps $$Cost = \sum_{i=0}^{i=n} \{(24/n)\{pd(i) + ps(i)\}Tariff(i)\}Weight$$

where pd(i) is the ith period direct acting system power input in kW ps(i) is the ith storage system input power kW Tariff(i) is the ith period price of fuel in pence/KW·hour. Weight (=1) is a weighted cost function element which is set high when no solution is obtainable. This drives the optimisation routine to seek a new solution which is feasible.

The power inputs for the ith periods are non-linear. The storage system power inputs are obtained by minimising the function Cost. The direct acting system power inputs for the ith period are obtained by inverting the thermal model of the room and by predicting the power output of the storage system using a dynamic mathematical model of this system. The storage heater output power is given by, $$qs(i) = (Storage\ System\ Model)\ ps(i)$$

where the Storage System Model can be linear or non-linear to predict output power qs(i) based on power input ps(i). Using the predicted storage system output the required direct acting system power can be obtained by inverting the room model such that, $$pd(i) = (Room\ Model)^{-1} Tmin(i) - qs(i)$$

where again the Room Model can be linear or non-linear and may not incorporate outside temperature information and Tmin(i) is the ith periods minimum temperature specified by the user input.

If pd(i) lies outside limits such that $$pd(i) > Maximum\ Direct\ System\ Power$$

then Weight—2.i.e. double the cost function to seek a new attainable solution.

Or if pd(i)<O i.e. requires cooling then pd(i) is reset to give $$pd(i) = 0,$$

since the temperature of the room is only required to be greater than the minimum specified temperature not necessarily equal to it.

These functions make up the non-linear function Cost which can be minimised by adjusting the nth number of storage heater inputs by calling any suitable Non-linear optimisation routine to Minimise(Cost).

Figure 5A:
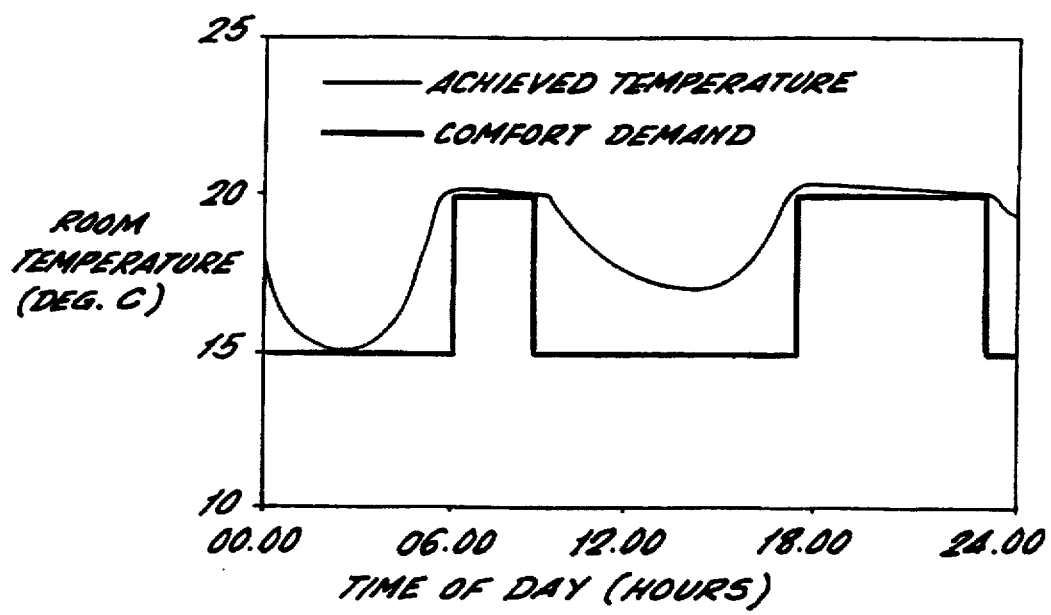
FIG. 5a illustrates a graph of a typical desired temperature and temperature achieved by an embodiment of the present invention for the living room of a typical married couple who are both working.
Figure 5B:
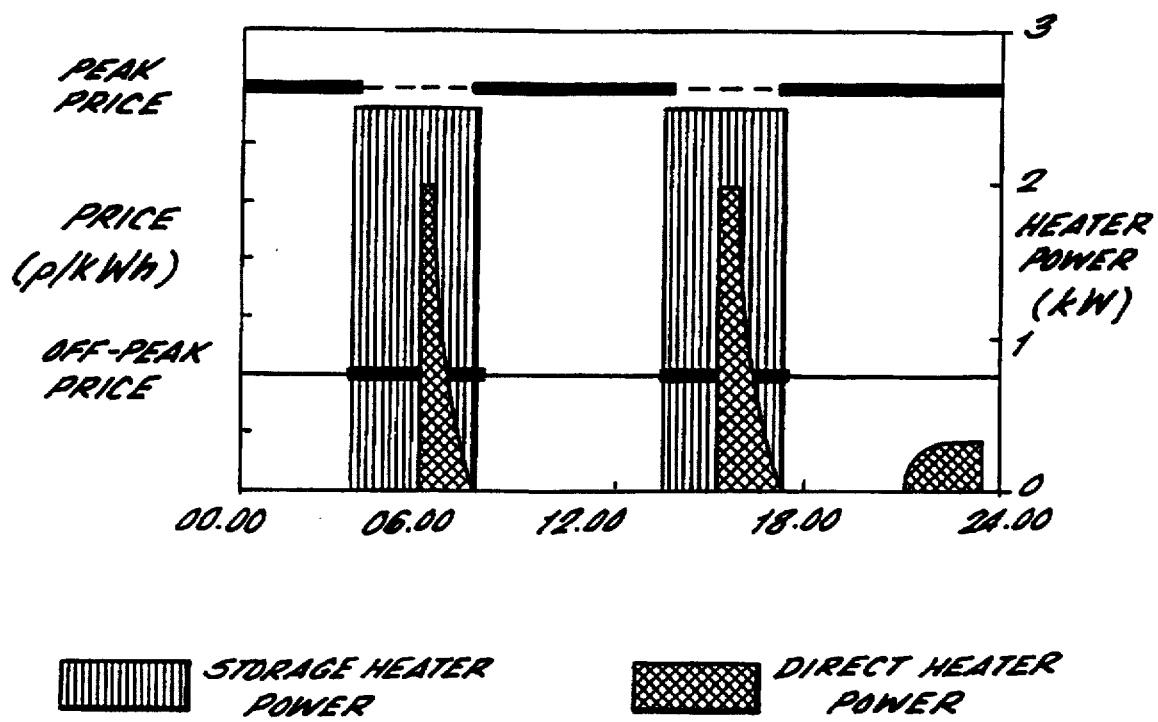
FIG. 5b illustrates an example of a variable cost tariff with the control solution to give minimum running costs.

FIG. 5a and 5b illustrate the operation of the heating control apparatus according to one embodiment of the present invention whereby the heating system receives a two-rate tariff having two cheap rate periods during a twenty four hour cycle.

FIG. 5a illustrates the desired temperature or comfort demand assumed for the living room of a young married couple who are both working. This graph also illustrates the achieved temperature which substantially matches the required temperature during the periods for which the desired temperature is required. In order to meet the desired temperature at these periods it can be seen that it is usually necessary for the achieved temperature to be rather higher than necessary during the periods of time when heating is not required.

FIG. 5b illustrates the electricity supply tariff and heater power provided by the storage heater and direct heater. The tariff is a two-rate tariff providing two cheap rate periods. If it is assumed that the cost function which is to be minimised is weighted towards reducing the total running costs then as shown in FIG. 5b the storage heater is energised for as much time as possible during the cheap rate periods. The storage heaters will then of course go on to radiate their heat following their charging. In order to ensure that the desired temperature is achieved, it is also necessary to energise the direct heater. As can be seen from FIG. 5b this is generally achieved during the cheap rate periods. Late in the evening in order to maintain the comfort level or required temperature it is necessary to draw electricity during the more expensive rate. The amount of power drawn is however relatively small.

FIG. 5 represents one particular solution for a two period two tariff supply wherein the cost function being reduced is the total running costs. It will of course be understood that when the desired temperature pattern and temperatures are changed and the multi-rate tariff used then the optimised control solution will be quite different. The control solution will also be quite different if the cost function is weighted towards reducing total energy consumption.

This control strategy has provided a simple means for the household to demand a temperature with occupancy times which will guarantee a high quality of comfort with competitive running costs when compared with other fuels. Moreover with communication of tariff information the electricity utilities have a powerful load management tool with high levels of confidence as to how the domestic load will respond to changes in tariff structure.

The heating control system is not just a step forward for a consumer in terms of running costs and quality of comfort, it is also an important load management system. The control algorithms will optimise to reduce power consumption at the times of day when the tariff price is high. This will allow the Utilities to confidently defer load from times of peak load on the distribution network. This will obviate the necessity for network reinforcement and promote the sale of profitable units.

What is claimed is:

1. Heating control apparatus for use in a heating system having electric heating means for space heating at least one location, said electric heating means comprising storage heating means and direct heating means provided at said location, and temperature measuring means for measuring the temperature at said location, said heating system being connected to an electricity supply having a cost profile indicating variations in electricity cost with time; said heating control apparatus comprising data receiving means for receiving data on said cost profile and weather prediction information; user selection means operable by a user to select a desired temperature for said location and a desired time and duration of said desired temperature; information storage means for storing information defining the thermal response characteristics of said location and said electric heating means; and control means responsive to said data received by said data receiving means, said temperature measuring means, said user selection means, and said stored information to determine the times at which each of said storage heating means and said direct heating means is energized, said control means being operative to control said heating means accordingly in order to achieve said desired temperature for said desired time and duration at said location, and to energize said storage heating means preferentially when the electricity cost is low.

2. Heating control apparatus as claimed in claim 1 wherein said control means is operative to control said direct heating means to only supply a small amount of the total heat input to said location in order to achieve said desired temperature at said location.

3. Heating control apparatus as claimed in claim 1 wherein said heating system includes respective said storage and direct heating means at each of a plurality of said locations and a respective said temperature measuring means for each said location, said user selection means being adapted to allow a user to select desired temperatures for each said location, and said control means being operative to independently control each said heating means to achieve the desired temperature in each said location.

4. Heating control apparatus as claimed in claim 1 wherein said control means is operative to use said stored information and said weather prediction information to calculate a predicted temperature for said location.

5. Heating control apparatus as claimed in claim 4 wherein said control means is operative to predict the electrical power required by said heating means to achieve said desired temperature by matching a predicted temperature for a power input with said desired temperature.

6. Heating control apparatus as claimed in claim 4 including feedback control means responsive to a difference between a said predicted temperature for said location and a measured temperature for said location to control said direct heating means to achieve said desired temperature at said location.

7. Heating control apparatus as claimed in claim 1 wherein said storage means is adapted to store respective model parameters for heating of said location by said storage heating means, said control means being operative to determine the relationship between direct heating power and measure temperature, and storage heating power and measured temperature using respective models which use respective said model parameters.

8. Heating control apparatus as claimed in claim 1 wherein said storage means is adapted to store values for coefficients of a set of weighted transfer functions.

9. Heating control apparatus as claimed in claim 4 wherein said control means is operative to compare the measured temperature at said location with the predicted temperature, and to modify said stored information adaptively to reduce any difference between the measured and predescribed temperatures.

10. Heating control apparatus as claimed in claim 1 wherein said control means is operative to control the energization of said heating means to reduce total energy consumption utilized in heating said location to achieve said desired temperature.

11. Heating control apparatus as claimed in claim 1 wherein said control means is operative to control the energisation of said heating means to preferentially utilise electricity which maximises the profit margin of the utility.

12. Heating control apparatus as claimed in claim 1 wherein said control means is operative to reduce a cost function comprising a weighted sum of at least two of the total cost, the energy consumption, and the inverse of the profit of the utility, the weights of the sum being selectable by a user.

13. Heating control apparatus as claimed in claim 12 wherein said control means includes weight selection means operable by a user to select the weights for the sum.

14. Heating control apparatus as claimed in claim 6 wherein said storage means contains a model of said thermal characteristics and said control means is operative to measure the power input to the direct heating means required to achieve said desired temperature and to modify said model to reduce said power.

* * * * *